No. 718,440. PATENTED JAN. 13, 1903.
H. J. ELSNER.
STEERING APPARATUS FOR VEHICLES.
APPLICATION FILED JULY 6, 1901.
NO MODEL. 2 SHEETS—SHEET 1.

No. 718,440. PATENTED JAN. 13, 1903.
H. J. ELSNER.
STEERING APPARATUS FOR VEHICLES.
APPLICATION FILED JULY 6, 1901.
NO MODEL. 2 SHEETS—SHEET 2.

WITNESSES:
Isabella Waldron
Adelaide C. Gleason

INVENTOR.
Hans Joachim Elsner
BY
Richardson
ATTORNEYS.

UNITED STATES PATENT OFFICE.

HANS JOACHIM ELSNER, OF KALK, NEAR COLOGNE, GERMANY, ASSIGNOR TO KÖLNER ACCUMULATOREN-WERKE GOTTFRIED HAGEN, OF KALK, NEAR COLOGNE, GERMANY.

STEERING APPARATUS FOR VEHICLES.

SPECIFICATION forming part of Letters Patent No. 718,440, dated January 13, 1903.

Application filed July 6, 1901. Serial No. 67,280. (No model.)

*To all whom it may concern:*

Be it known that I, HANS JOACHIM ELSNER, engineer, a subject of the King of Prussia, residing at Kalk, near Cologne, on the Rhine, Germany, have invented certain new and useful Improvements in Steering Apparatuses for Automobiles and the Like; and I do hereby declare that the following is a full, clear, and exact description.

As is well known, it is of great importance for all motor-cars to possess a steering apparatus which admits of theoretically-correct steering or with only slight deviations therefrom.

The necessary condition for theoretically-correct steering is, as has been known for a long time, that the axes of all the wheels prolonged in horizontal projection must in all positions intersect at one point. If this is not the case, the car cannot turn without the slipping of one or other of the wheels.

The usual steering apparatuses for motor-cars depend on the movement of the front wheels, located on the steering-axle, but only give a practicable approximation to the theoretically-correct steering within a small angle of rotation, while it is manifestly desirable to obtain a satisfactory approximation to the theoretically-correct steering up to an angle of one hundred and eighty degrees. This is specially desirable for front-wheel steering, as the greater advantage of this system can only then become practically available.

In order to enable the steering to be almost exactly theoretically correct, according to the present invention the points of attachment of the steering-bar can slide on the levers of the ordinary axle-pivots, and at the same time the said points of attachment are guided elliptically in a suitable manner.

Figure 1:
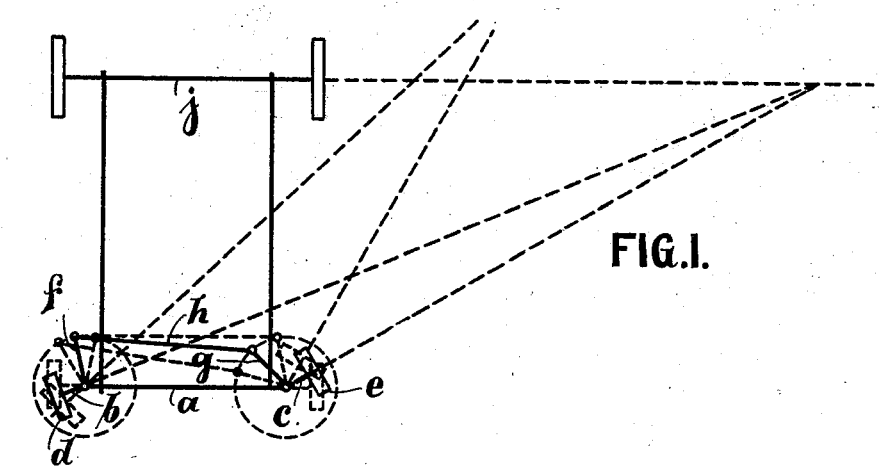
Figure 2:
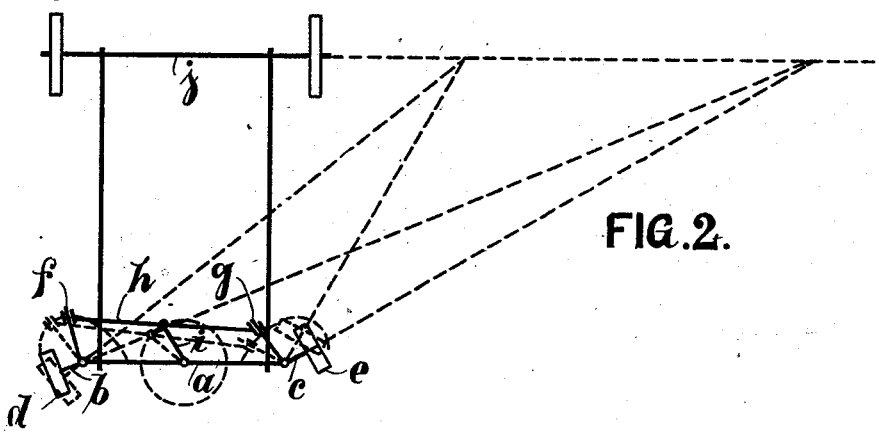
Figure 3:
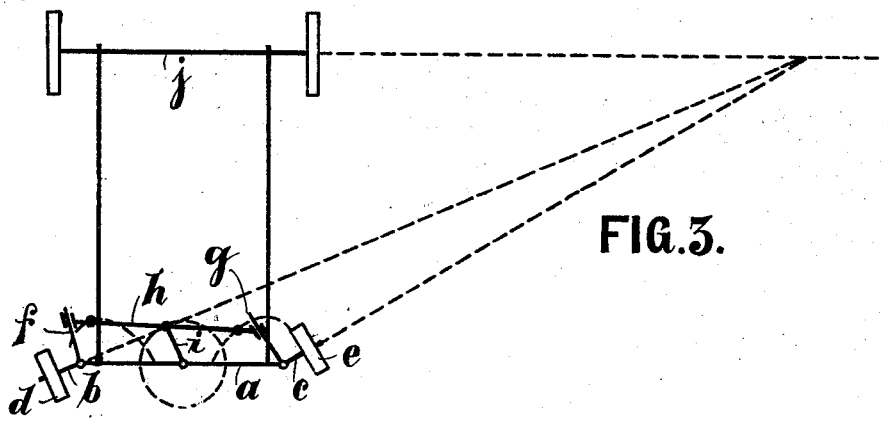
Figure 4:
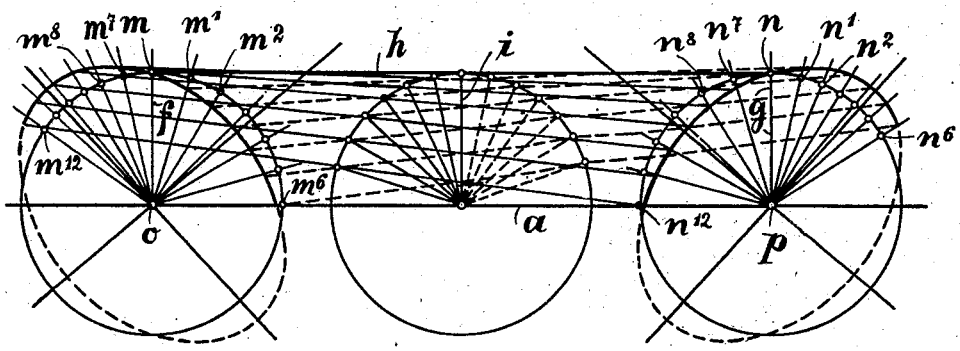
Figure 5:
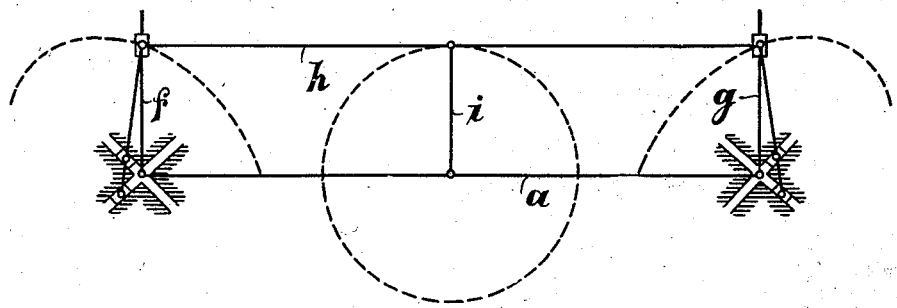

In the accompanying drawings, Figure 1 illustrates diagrammatically one of the most usual steering arrangements for automobiles for the purpose of demonstrating its defects. Fig. 2 shows diagrammatically one form of construction of the new steering apparatus. Fig. 3 illustrates another constructional modification of the invention. Fig. 4 illustrates the mathematical principle on which the new steering apparatus is constructed. Fig. 5 shows diagrammatically a constructional form of the elliptic guide used in the new steering apparatus.

In Figs. 1 to 3, $a$ is the fixed part of the front axle; $b$ and $c$, the axle-pivots linked thereto in the usual manner and which bear the front wheels $d$ $e$. From the axle-pivots project laterally, levers $f$ $g$, with which the steering-bar $h$ engages.

It will be seen that the points of attachment of the steering-bar with the levers $f$ and $g$ cannot move in the ordinary construction illustrated in Fig. 1. In order to obtain an approximately correct steering, the angles between the axle-arms $b$ $c$ and the respective levers $f g$ are obtuse angles; but notwithstanding this special form the defects of the steering apparatus are very considerable when the curve to be described is in any degree sharp, as Fig. 1 shows.

In order to obtain the theoretically-correct steering in the present invention, the points of contact of the steering-bar $h$ on the levers $f$ $g$ are arranged movably and the car is guided by means of a lever $i$, which is linked centrally to the steering-bar $h$ and is revoluble around the center of the front axle $a$, Figs. 2 and 3. By this means the points of contact of the steering-bar $h$ on the levers $f g$ do not describe a circle, as in the construction shown in Fig. 1, but a special curve the form of which will be seen from Fig. 4.

Let us assume that the radii $o$ $m'$ $o$ $m^2$, &c., and $p$ $n'$ $p$ $n^2$, &c., are the respective corresponding positions of the levers $f$ and $g$ for theoretically-correct steering. If the steering-bar $h$ is placed for each of these positions, so that its center lies on a circle with the radius $i$ around the center of the front-wheel axle $a$ and so that its ends lie on two theoretic respective positions $o$ $m$ and $p$ $n$, it appears that the points of contact of the steering-bar on the levers $f g$ each describe a curve which approximates to an ellipse with great exactitude. The center of the ellipse is the center of rotation $o$ or $p$. Neither of the two main axes of the ellipse falls on the front axle, but they incline from the axle $a$ about forty-five degrees. The eccentricity of the curve is too great for it to be replaced by a circle, but small enough to be able to conveniently use an elliptic steering apparatus, and preferably the extended elliptic steering device for guiding the point of attachment. A construction of this kind is shown in Fig. 5, in which the two slides for an elliptic steering apparatus are rigidly connected with the front axle. In this form of construction the point of contact of the steering-bar $h$ with the levers $f$ and $g$ describes an ellipse, while the center of the steering-bar describes a circle. It would of course theoretically be sufficient to guide the steering-bar only in two points—for instance, one end following an ellipse and the center a circle; but it is preferable to guide three points of the steering-bar, as in practice twisting, &c., has to be reckoned with. If it be desired for any reason not to guide directly the point of contact of the steering-bar, any other point of the respective curve may be guided, as is indicated, for instance, in Fig. 3. In this the points guided lie closer to the center of the steering-bar than the points of attachment. The ellipses which occur with this form of construction consequently have less eccentricity. In conclusion, it must be pointed out that a parallel position of the levers $f\ g$ in the central position is not absolutely necessary. With other symmetrical positions similar ellipses result in the manner described.

Having now described my invention, what I claim as new, and desire to secure by Letters Patent, is—

1. In a steering apparatus for automobiles and the like, the combination with the transversely-movable steering-bar, having its center connected with the rigid axle by a link, of the levers carrying the axle-pivots, the ends of the steering-bar sliding on said levers and being guided in elliptical paths, the major axis of said elliptical path passing through the pivot of the lever and at an inclination to the front axle, substantially as described.

2. In a steering apparatus for automobiles and the like, the combination with the transversely-movable steering-bar, having its center connected with the rigid axle by a link, of the levers carrying the axle-pivots, the ends of the steering-bar sliding on said levers and extended elliptic steering devices for guiding the ends of the steering-bar in elliptical paths, the major axis of said elliptical path passing through the pivot of the lever and at an inclination to the front axle, substantially as described.

In witness whereof I have hereunto set my hand in presence of two witnesses.

HANS JOACHIM ELSNER.

Witnesses:
ERICH SIEG,
H. BOHN.